(12) United States Patent
Tamura et al.

(10) Patent No.: US 8,320,503 B2
(45) Date of Patent: Nov. 27, 2012

(54) RECEIVER

(75) Inventors: Hirotaka Tamura, Kawasaki (JP);
Masaya Kibune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 12/730,725

(22) Filed: Mar. 24, 2010

(65) Prior Publication Data

US 2010/0246734 A1 Sep. 30, 2010

(30) Foreign Application Priority Data

Mar. 30, 2009 (JP) ................................ 2009-083618

(51) Int. Cl.
*H04L 27/00* (2006.01)
(52) U.S. Cl. ......... 375/326; 375/316; 327/147; 327/156
(58) Field of Classification Search .................. 375/316, 375/326, 324, 340; 327/147, 156
See application file for complete search history.

(56) References Cited

U.S. PATENT DOCUMENTS

| | | | | |
|---|---|---|---|---|
| 4,507,617 A | * | 3/1985 | Sasaki | 329/309 |
| 5,291,499 A | * | 3/1994 | Behrens et al. | 714/796 |
| 5,761,212 A | * | 6/1998 | Foland et al. | 714/719 |
| 6,407,642 B2 | * | 6/2002 | Dosho et al. | 331/11 |
| 2006/0039513 A1 | | 2/2006 | Sheen et al. | |
| 2006/0109942 A1 | | 5/2006 | Vallet | |

FOREIGN PATENT DOCUMENTS

WO    WO 92/22171 A1    12/1992

OTHER PUBLICATIONS

O. Agazzi et al., "A 90nm CMOS DSP MLSD Transceiver with Integrated AFE for Electronic Dispersion Compensation of Multi-mode Optical Fibers at 10Gb/s", ISSCC Dig. of Tech. Papers, pp. 232-233, 609, Feb. 2008.
M. Harwood et al., "A 12.5Gb/s SerDes in 65nm CMOS Using a Baud-Rate ADC with Digital Receiver Equalization and Clock Recovery", ISSCC Dig. of Tech. Papers, pp. 436-437, 613, Feb. 2007.

* cited by examiner

*Primary Examiner* — Ted Wang
(74) *Attorney, Agent, or Firm* — Arent Fox LLP

(57) ABSTRACT

A receiver that receives a train of a plurality of symbols representing digital data, includes: an isolated pulse detector that detects whether the digital data includes an isolated pulse in the symbol train, respectively; a phase detector that detects a timing at which the level of the symbols changes; a symbol value converter that converts the symbols into logical values on the basis of the timing detected by the phase detector; and a data selector that selects a logical value of the isolated pulse instead of the logical value converted by the symbol value converter when the isolated pulse detector detects the digital data containing the isolated pulse.

9 Claims, 13 Drawing Sheets

RECEIVER

CROSS-REFERENCE TO RELATED APPLICATION

This application is based upon and claims the benefit of priority of the prior Japanese Patent Application No. 2009-083618 filed on Mar. 30, 2009, the entire contents of which are incorporated herein by reference.

FIELD

The embodiments discussed herein are related to a receiver.

BACKGROUND

Signal transmission speed between components and elements may improve system performance in addition to improving the performance of the individual components. For example, the signal transmission rate between a memory like a static random access memory (SRAM) or a dynamic random access memory (DRAM) and a processor may improve the performance of a computer used as a server. Owing to performance improvement of other information processing apparatuses than servers, such as communication infrastructure apparatuses, it is necessary to increase data rates of signal transmission and reception inside and outside an apparatus.

The data rate of each input/output (I/O) circuit for inputting and/or outputting signals to a range from a few Gb/s to a few tens of Gb/s may increase in many integrated circuits (ICs). An I/O circuit may perform various signal processing operations including an operation for compensating for waveform distortion of a received signal and an operation for restoring a clock needed for receiving the signal. A circuit for performing such signal processing operations may include an analog circuit. Related art discussed in "A 90 nm CMOS DSP MLSD Transceiver with Integrated AFE for Electronic Dispersion Compensation of Multi-mode Optical Fibers at 10 Gb/s", *ISSCC Dig. of Tech. Papers*, pp. 232-233, 609, February 2008, by O. Agazzi, et al. and "A 12.5 Gb/s SerDes in 65 nm CMOS Using a Baud-Rate ADC with Digital Receiver Equalization and Clock Recovery", *ISSCC Dig. of Tech. Papers*, pp. 436-437, 613, February 2007, by M. Harwood, et al., for instance.

SUMMARY

According to an aspect of the embodiment, a receiver that receives a train of a plurality of symbols representing digital data, includes: an isolated pulse detector that detects whether the digital data includes an isolated pulse in the symbol train, respectively; a phase detector that detects a timing at which the level of the symbols changes; a symbol value converter that converts the symbols into logical values on the basis of the timing detected by the phase detector; and a data selector that selects a logical value of the isolated pulse instead of the logical value converted by the symbol value converter when the isolated pulse detector detects the digital data containing the isolated pulse.

It is to be understood that both the foregoing general description and the following detailed description are exemplary and explanatory and are not restrictive of the invention, as claimed.

BRIEF DESCRIPTION OF DRAWINGS

FIGS. 10-1A to 10-1D and 10-2A to 10-2C are explanatory diagrams illustrating data judgment operation performed by the data judgment circuit of the embodiment;

DESCRIPTION OF EMBODIMENTS

Figure 1:
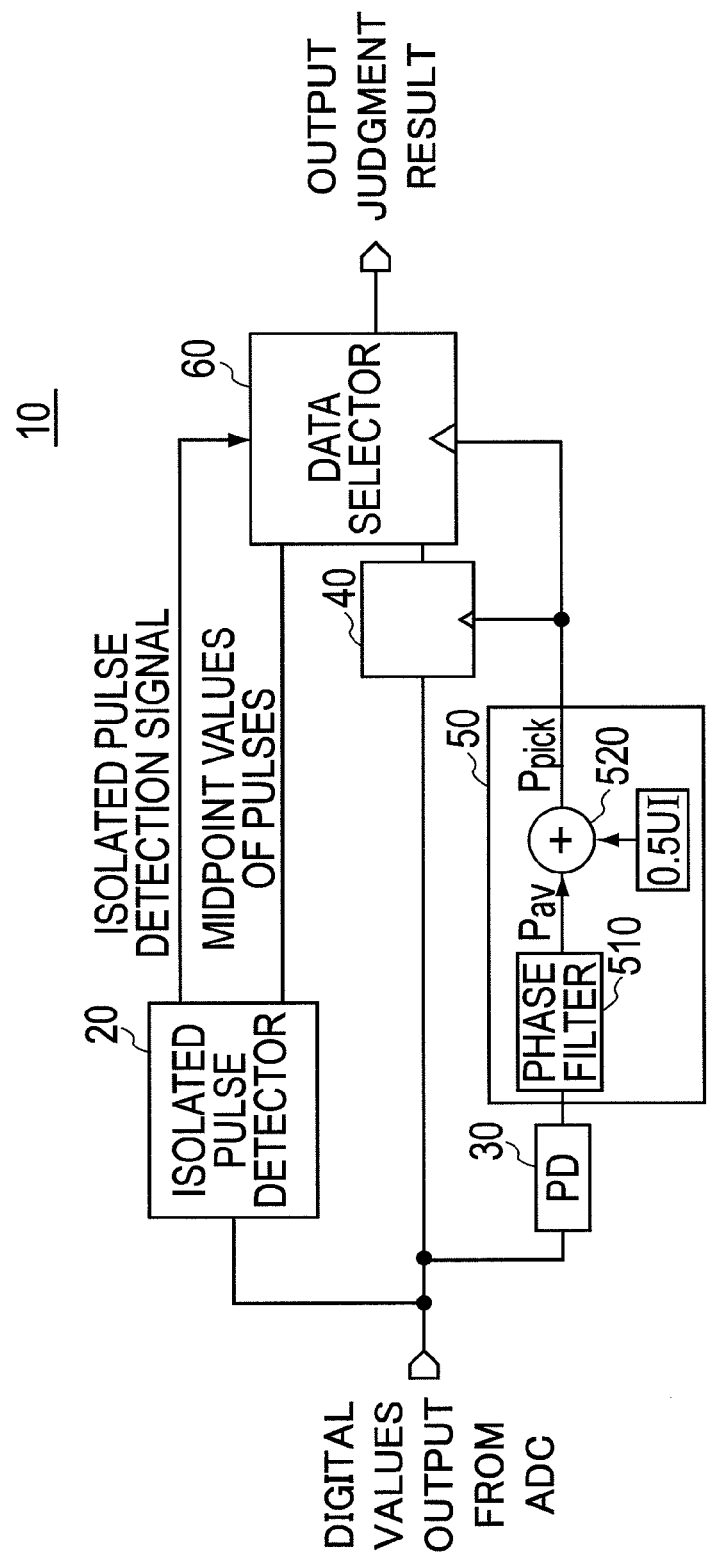
FIG. 1 is a block diagram illustrating the configuration of a data judgment circuit according to an embodiment.

An effective approach to overcoming the aforementioned problem concerning circuit complexity and power consumption of a receiver employing an analog-to-digital converter (ADC) is to decrease the resolution of the ADC and the number of bits used for digital signal processing. Practically, however, there are limitations in the extent to which the resolution of the ADC and the number of bits used for digital signal processing can be reduced without sacrificing the performance of the apparatus.

A receiver receives a train of a plurality of symbols representing digital data. The plurality of symbols is generally a non-return to zero (NRZ) binary signal containing a sequence of symbols expressed by 0s and/or 1s. An ADC converts received signal amplitude into digital values with discrete timing. The received signal is input into the ADC after passing through a preamplifier and/or an equalizer, if necessary. The receiver further includes a data judgment circuit for judging data of each successive symbol on the basis of the digital values output from the ADC, wherein "data judgment" refers to an operation for judging the state of each symbol contained in the digital data signal, or for determining whether the value of each symbol is 0 or 1. Since a circuit required for judging the data of each successive symbol is simple, such a circuit is widely used in high-speed I/O applications. Symbol-to-symbol interference may occur, however, owing to various factors including frequency characteristics of a transmission channel and/or reflection of the signal at impedance mismatching points like connectors or via holes, potentially leading to a situation where performing a data judgment operation on each successive symbol is not an optimal approach.

The inventor has found a phenomenon that errors in judging data of each successive symbol increases owing to the influence of symbol-to-symbol interference occurring in a special symbol train received by a receiver employing an ADC. Further, the inventor has found that it is possible to improve data judgment accuracy by judging data of an entire symbol train instead of judging data of each successive symbol in the case of a special symbol train. In the context of the present Specification, the term "special symbol train" refers to a symbol train like "0001000" containing a single symbol which takes one unique value among symbols that take a common value differing from the unique value. The single symbol that takes one unique value contained in the special symbol train is hereinafter referred to as an "isolated pulse".

An embodiment of the invention is described hereinbelow with reference to a receiver which samples input data using a double over-sampling technique, or at a sampling rate twice as high as the data transmission rate. In this embodiment, a sampling phase is 0.5UI which is half a pulsewidth UI (i.e., a phase corresponding to one symbol) of a unit symbol. This means that the receiver can process a digital data signal upon dividing the same into 0.5UI-long segments.

FIG. 1 illustrates a data judgment circuit 10 according to the embodiment. The data judgment circuit 10 of FIG. 1 is assembled into the receiver which is provided with an ADC (not illustrated). Located in a succeeding stage of the ADC, the data judgment circuit 10 receives digital values output from the ADC. It is assumed, for example, that the digital values input into the data judgment circuit 10 at points in time $t_{i-1}$, $t_i$ ($=t_{i-1}+0.5UI$) and $t_{i+1}$ ($=t_{i-1}+1UI$) (where i in an integer) are $d_{i-1}$, $d_i$ and $d_{i+1}$, respectively. These values are input in the form of a differential signal associated with symbols. The data judgment circuit 10 can judge data of the symbol train on the basis of the input digital values. To make this possible, the data judgment circuit 10 includes an isolated pulse detector 20, a phase detector 30, a symbol value converter 40, a judgment timing generator 50 and a data selector 60.

The isolated pulse detector 20 detects whether the digital data includes an isolated pulse in a symbol train, respectively. The isolated pulse detector 20 determines whether the symbol train having a specific bit length is a special symbol train by detecting whether an isolated pulse is present in the symbol train on the basis of the digital values input into the data judgment circuit 10. If an isolated pulse is detected, the isolated pulse detector 20 outputs a binary value (0 or 1) of the isolated pulse.

The phase detector 30 detects a timing at which the level of the symbols changes. The phase detector 30 detects a timing at which the value of each successive symbol in a symbol train changes from 1 to 0 or from 0 to 1 by detecting an instantaneous value at a zero-crossing point of the digital values input into the data judgment circuit 10. The phase detector 30 outputs a signal $P_{inst}$ indicating the timing at which the symbol value changes.

The symbol value converter 40 converts the symbols into logical values on the basis of the timing detected by the phase detector 30. The symbol value converter 40 judges data of each successive symbol with specific timing on the basis of the signal $P_{inst}$ output from the phase detector 30 and outputs the logical values.

The judgment timing generator 50 shifts a half of a period of the symbol from an average of the timings at which the symbol value changes. The judgment timing generator 50 performs a filtering operation to smooth out the signal $P_{inst}$ output from the phase detector 30 and obtains a timing of data judgment to be made by the symbol value converter 40 from the smoothed signal $P_{inst}$. For this reason, the judgment timing generator 50 includes a phase filter 510 and an adder 520. The phase filter 510 can calculate the average of the timings at which the symbol value changes. The phase filter 510 can generate a signal $P_{av}$ indicating an average of timings at which the symbol value changes by smoothing out the signal $P_{inst}$ output from the phase detector 30. The adder 520 can generate a signal $P_{pick}$ indicating the timing of data judgment by shifting the phase of the average signal $P_{av}$ generated by the phase filter 510 by 0.5UI. The adder 520 shifts the phase of the average signal $P_{av}$ by 0.5UI frontward or rearward so that the phase of the average signal $P_{av}$ does not exceed 1.

The data selector 60 selects a logical value of the isolated pulse instead of the logical value converted by the symbol value converter 40 when the isolated pulse detector 20 detects the digital data containing the isolated pulse. The data selector 60 selects one of binary values output from the isolated pulse detector 20 and the symbol value converter 40 in accordance with the result of judgment made by the isolated pulse detector 20.

Figure 2:
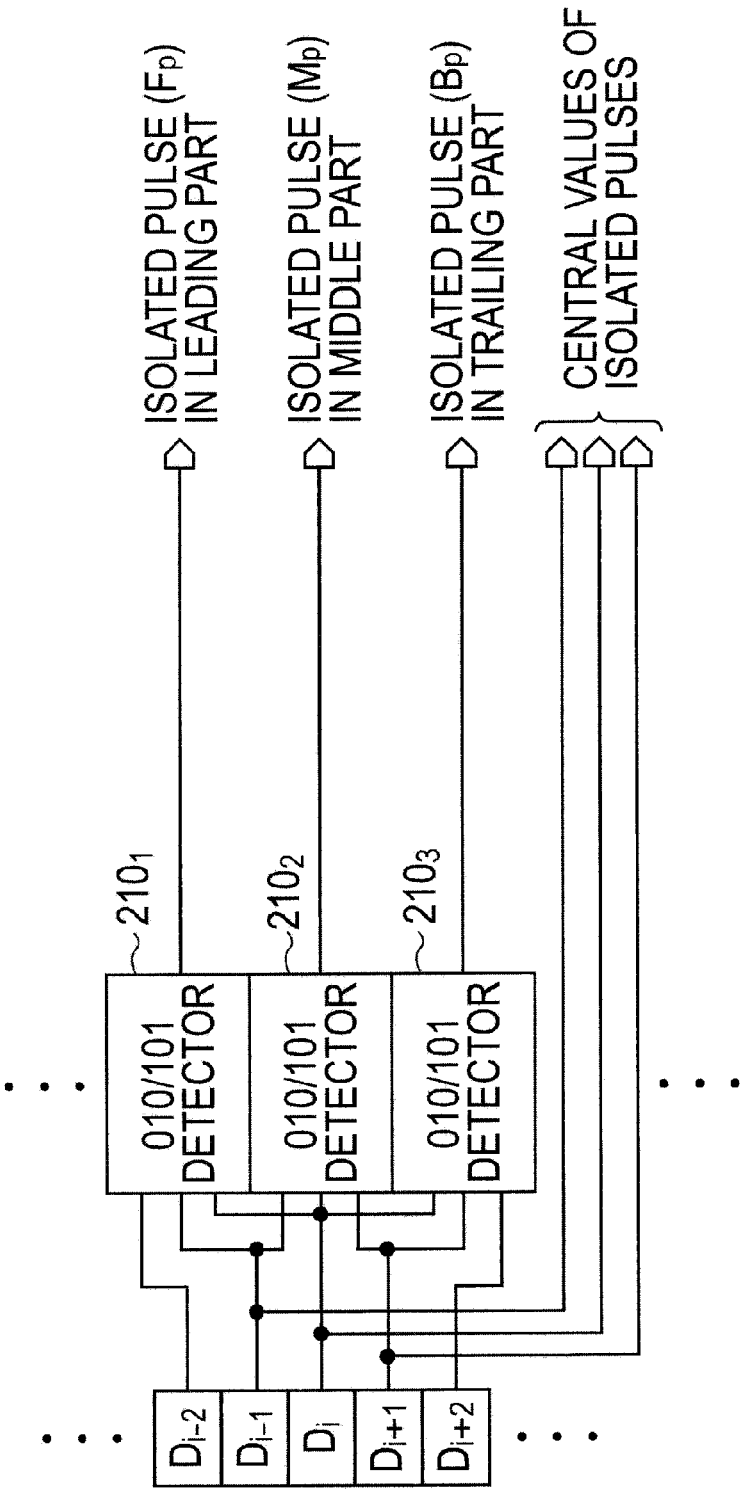
FIG. 2 is a schematic diagram illustrating the configuration of an isolated pulse detector used in the data judgment circuit of the embodiment.

FIG. 2 illustrates the isolated pulse detector 20 used in the data judgment circuit 10 of FIG. 1. The isolated pulse detector 20 converts the symbols of the digital data into logical values, and detects the digital data including the isolated pulse when a midpoint logical value of the symbol train is different from logical values next to the midpoint logical value. The isolated pulse detector 20 receives parallel binary data $D_n$ (n= . . . −2, −1, 0, 1, 2, . . . ) which is a sequence of values obtained by converting digital values $d_n$ input to the receiver into logical values using a specific threshold value. As an example, it is assumed that the binary data input into the isolated pulse detector 20 at the aforementioned points in time $t_{i-1}$, ($=t_{i-1}+0.5UI$) and $t_{i+1}$ ($=t_{i-1}+1UI$) (where i in an integer) are denoted by reference symbols $D_{i-1}$, $D_i$ and $D_{i+1}$, respectively.

The isolated pulse detector 20 includes a plurality of special pulse train detectors $210_m$ (m= . . . −2, −1, 0, 1, 2, . . . ) for detecting whether each of three consecutive binary data $D_{i-1}$, $D_i$ and $D_{i+1}$ is one of pulse trains "010" and "101". For the sake of clarity, FIG. 2 illustrates only the first, second and third special pulse train detectors $210_1$, $210_2$, $210_3$.

As depicted in FIG. 2, three consecutive data $D_{i-2}$, $D_{i-1}$ and $D_i$ are input into the first special pulse train detector $210_1$, three consecutive data $D_{i-1}$, $D_i$ and $D_{i+1}$ are input into the second special pulse train detector $210_2$ and three consecutive data $D_i$, $D_{i+1}$ and $D_{i+2}$ are input into the third special pulse train detector $210_3$. As indicated in this example, combinations of three consecutive data input into the individual special pulse train detectors $210_m$ are offset by a phase of 0.5UI. It is understood from above that a range of phase covered by three consecutive binary data corresponds to a phase range equal to 1UI covered by one symbol.

Figure 3:
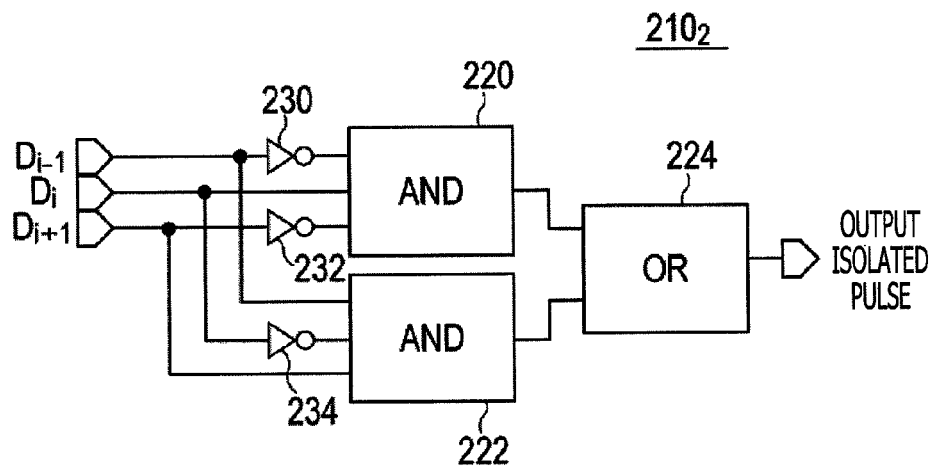
FIG. 3 is a schematic diagram illustrating the configuration of a special pulse train detector contained in the isolated pulse detector of FIG. 2.

FIG. 3 illustrates the configuration of the second special pulse train detector $210_2$ which includes first and second AND circuits 220, 222, an OR circuit 224 and first to third NOT circuits 230, 232, 234.

The first AND circuit 220 receives the (i−1)th data $D_{i-1}$ inverted by the first NOT circuit 230, the ith data $D_i$, and the (i+1)th data $D_{i+1}$ inverted by the second NOT circuit 232 and outputs 1 if only the ith data $D_i$ is 1.

The second AND circuit 222 receives the (i−1)th data $D_{i-1}$, the ith data $D_i$ inverted by the third NOT circuit 234 and the (i+1)th data $D_{i+1}$ and outputs 1 if only the ith data $D_i$ is 0.

The OR circuit 224 outputs 1 if at least one of outputs of the first and second AND circuits 220, 222 is 1.

According to the above-described configuration, the second special pulse train detector $210_2$ can detect whether each of the three consecutive binary data $D_{i-1}$, $D_i$ and $D_{i+1}$ is one of pulse trains "010" and "101". The other special pulse train detectors $210_1$, $210_3$ and $210_m$ may have substantially the same configuration as the second special pulse train detector $210_2$ illustrated in FIG. 3.

The isolated pulse detector 20 outputs the midpoint logical value and timing information of the isolated pulse to the data selector when the midpoint logical value of the symbol train is different from logical values next to the midpoint logical value.

Referring again to FIG. 2, if $\{D_{i-2}; D_{i-1}; D_i; D_{i+1}; D_{i+2}\}=\{00100\}$ is input into the isolated pulse detector 20, for example, the second special pulse train detector $210_2$ detects that the pulse train "010" has been input and outputs "1" as timing information of the isolated pulse. This means that the isolated pulse detector 20 can notify a circuit in a succeeding stage that an isolated pulse is contained in 3 bits in a middle part of a 5-bit data pulse train by outputting "1" from the second special pulse train detector $210_2$. Similarly, if "1" is output from the first special pulse train detector $210_1$, it means that an isolated pulse is contained in 3 bits in a leading part of the 5-bit data pulse train. Also, if "1" is output from the third special pulse train detector $210_3$, it means that an isolated pulse is contained in 3 bits in a trailing part of the 5-bit data pulse train. Here, signals output from the first, second and third special pulse train detectors $210_1$, $210_2$, $210_3$ are designated by reference symbols $F_p$, $M_p$ and $B_p$, respectively.

The phase range covered by binary data containing three consecutive bits corresponds to the phase range of 1UI covered by one symbol as mentioned earlier. Therefore, the isolated pulse detector 20 can detect an isolated pulse having a 1-bit length by detecting that the binary data containing three consecutive bits is one of the pulse trains "010" and "101".

Further, the isolated pulse detector 20 outputs the data $D_{i-1}$, $D_i$ and $D_{i+1}$ located at the middle among the three consecutive binary data input into the first, second and third special pulse train detectors $210_1$, $210_2$ and $210_3$, respectively. These data $D_{i-1}$, $D_i$ and $D_{i+1}$ correspond to "midpoint logical values of isolated pulses" when special pulse trains are detected by the first, second and third special pulse train detectors $210_1$, $210_2$ and $210_3$, respectively.

Figure 4:
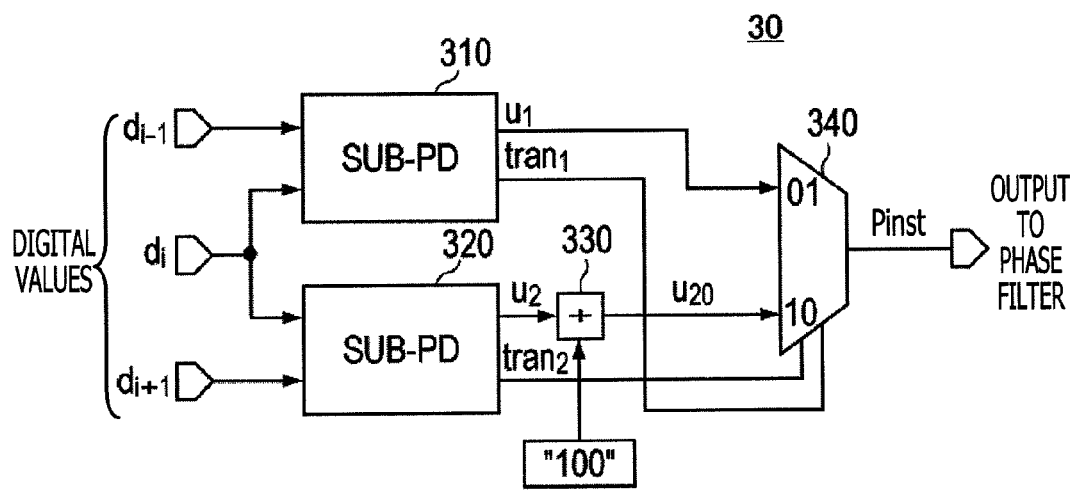
FIG. 4 is a schematic diagram illustrating the configuration of a phase detector used in the data judgment circuit of the embodiment.

FIG. 4 illustrates the phase detector 30 used in the data judgment circuit 10 of FIG. 1. The phase detector 30 includes first and second sub-phase detectors 310, 320, an adder 330 and a selector 340.

The first sub-phase detector 310 detects the presence or absence of a transition of the symbol value as well as a timing of such a transition based on the most significant bit value $d_{i-1}$ and the intermediate bit value $d_i$ among the 3-bit digital values $d_{i-1}$, $d_i$ and $d_{i+1}$ input during a period 1UI. On the other hand, the second sub-phase detector 320 detects the presence or absence of a transition of the symbol value as well as a timing of such a transition based on the intermediate bit value $d_i$ and the least significant bit value $d_{i+1}$ among the 3-bit digital values $d_{i-1}$, $d_i$ and $d_{i+1}$.

Figure 5:
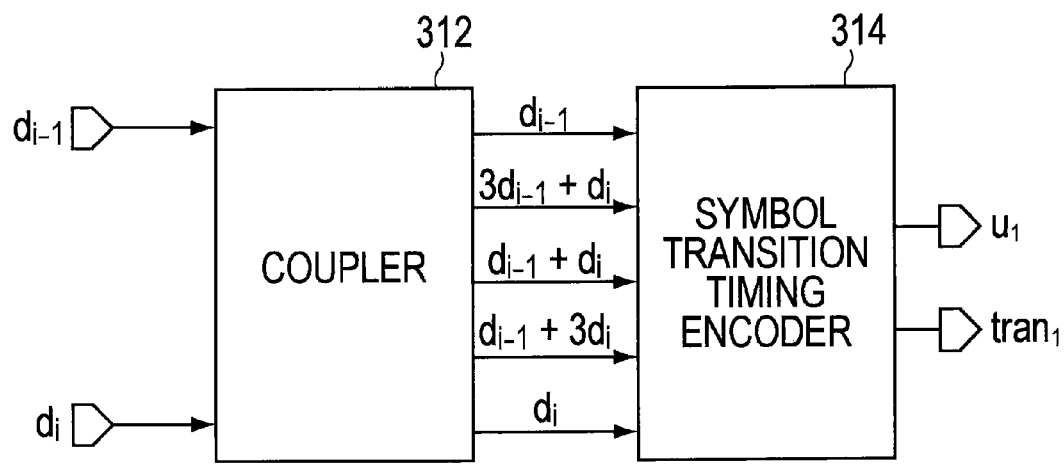
FIG. 5 is a schematic diagram illustrating the configuration of a sub-phase detector contained in the phase detector of FIG. 4.

FIG. 5 illustrates the configuration of the first sub-phase detector 310 (320) contained in the phase detector 30 of FIG. 4. FIG. 5 actually illustrates, by way of example, the configuration of the first sub-phase detector 310 which detects the presence or absence of a transition of the symbol value and a timing of the transition based on the most significant bit value $d_{i-1}$ and the intermediate bit value $d_i$.

The first sub-phase detector 310 includes a coupler 312 and a symbol transition timing encoder 314. The coupler 312 combines the most significant bit value $d_{i-1}$ and the intermediate bit value $d_i$ by performing multiplying and adding/subtracting operations so as to output values $d_{i-1}$, $3d_{i-1}+d_i$, $d_{i-1}+d_i$, $d_{i-1}+3d_i$ and $d_i$. The symbol transition timing encoder 314 detects the presence or absence of a transition of the symbol value and a timing of the symbol value transition based on the individual values $d_{i-1}$, $3d_{i-1}+d_i$, $d_{i-1}+d_i$, $d_{i-1}+3d_i$ and $d_i$ output from the coupler 312.

Figure 6:
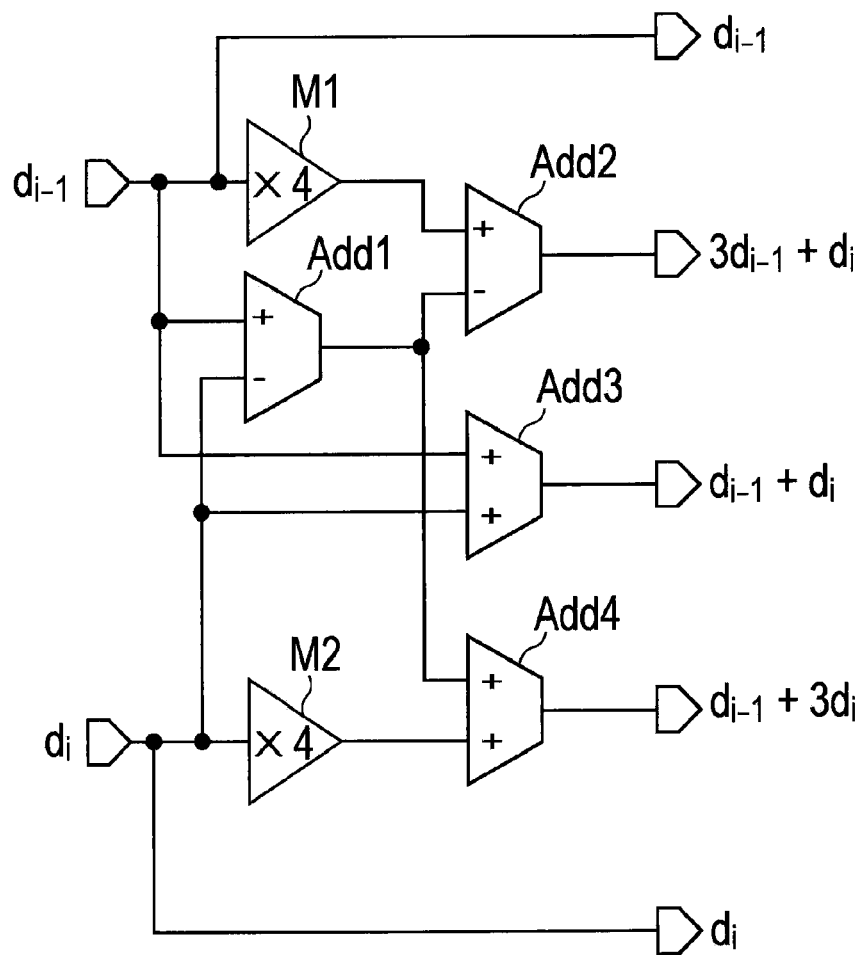
FIG. 6 is a schematic diagram illustrating the configuration of a coupler contained in the sub-phase detector of FIG. 5.

FIG. 6 illustrates the coupler 312 contained in the first sub-phase detector 310 of FIG. 5. The coupler 312 includes first and second multipliers M1, M2 and first to fourth adder-subtractors Add1-Add4.

The multiplier M1 multiplies the most significant bit value $d_{i-1}$ by a coefficient 4. The first adder-subtractor Add1 subtracts the intermediate bit value $d_i$ from the most significant bit value $d_{i-1}$ to generate a value $d_{i-1}-d_i$. The second adder-subtractor Add2 subtracts the value $d_{i-1}-d_i$ obtained by the first adder-subtractor Add1 from a value $4d_{i-1}$ obtained by the multiplier M1 to generate the value $3d_{i-1}+d_i$. This value $3d_{i-1}+d_i$ is input into the symbol transition timing encoder 314 in a succeeding stage.

The third adder-subtractor Add3 adds the most significant bit value $d_{i-1}$ and the intermediate bit value $d_i$ together to generate the value $d_{i-1}+d_i$. This value $d_{i-1}+d_i$ is also input into the symbol transition timing encoder 314 in the succeeding stage.

The multiplier M2 multiplies the intermediate bit value $d_i$ by the same coefficient 4 mentioned above. The fourth adder-subtractor Add4 adds the value $4d_i$ obtained by the multiplier M2 and the value obtained by the first adder-subtractor Add1 to generate the value $d_{i-1}+3d_i$. This value $d_{i-1}+3d_i$ is also input into the symbol transition timing encoder 314 in the succeeding stage.

The coupler 312 further outputs the most significant bit value $d_{i-1}$ and the intermediate bit value $d_i$ which are input into the coupler 312. These values $d_{i-1}$, $d_i$ are also input into the symbol transition timing encoder 314 in the succeeding stage.

The coupler 312 supplies the aforementioned five values $d_{i-1}$, $3d_{i-1}+d_i$, $d_{i-1}+d_i$, $d_{i-1}+3d_i$ and $d_i$ to the symbol transition timing encoder 314 in a manner described above.

Based on these values, the symbol transition timing encoder 314 outputs a 1-bit binary signal $tran_1$ indicating a transition of the symbol value and a 2-bit binary signal $u_1$ indicating a timing of the symbol value transition under below-described conditions (1) to (5).

(1) A state in which one of $d_{i-1}$ and is equal to or larger than 0 indicates that the symbol value has changed from 1 to 0 or from 0 to 1 during a period from $t_{i-1}$ to $t_{i-1}+(\frac{1}{8})$UI. In this case, the symbol transition timing encoder 314 outputs $tran_1=1$ and $u_1=00$.

(2) A state in which one of $3d_{i-1}+d_i$ and $d_{i-1}+d_i$ is equal to or larger than 0 indicates that the symbol value has changed from 1 to 0 or from 0 to 1 during a period from $t_{i-1}+(\frac{1}{8})$UI to $t_{i-1}+(\frac{1}{4})$UI. In this case, the symbol transition timing encoder 314 outputs $tran_1=1$ and $u_1=01$.

(3) A state in which one of $d_{i-1}+d_i$ and $d_{i-1}+3d_i$ is equal to or larger than 0 indicates that the symbol value has changed from 1 to 0 or from 0 to 1 during a period from $t_{i-1}+(\frac{1}{4})$UI to $t_{i-1}+(\frac{3}{8})$UI. In this case, the symbol transition timing encoder 314 outputs $tran_1=1$ and $u_1=10$.

(4) A state in which one of $d_{i-1}+3d_i$ and $d_i$ is equal to or larger than 0 indicates that the symbol value has changed from 1 to 0 or from 0 to 1 during a period from $t_{i-1}+(\frac{3}{8})$UI to $t_{i-1}+(\frac{1}{2})$UI ($=t_i$). In this case, the symbol transition timing encoder 314 outputs $tran_1=1$ and $u_1=11$.

(5) A state other than those above, that is, a state in which all of the values $d_{i-1}$, $3d_{i-1}+d_i$, $d_{i-1}+d_i$, $d_{i-1}+3d_i$ and $d_i$ are equal to or larger than 0 or less than 0 indicates that the symbol value does not change during a period from $t_{i-1}$ to $t_i$. In this case, the symbol transition timing encoder 314 outputs tran$_1$=0.

The second sub-phase detector 320 may have substantially the same configuration as the first sub-phase detector 310 which has been described above with reference to FIGS. 5 and 6. The second sub-phase detector 320 detects the presence or absence of a transition of the symbol value as well as a timing of such a transition based on the intermediate bit value $d_i$ and the least significant bit value $d_{i+1}$ among the 3-bit values $d_{i-1}$, $d_i$ and $d_{i+1}$ input during the period 1UI. In other words, the second sub-phase detector 320 detects the presence or absence of a transition of the symbol value and a timing of the symbol value transition for a period of 0.5UI ($t_i$ to $t_{i+1}$) which is a latter half of the specific period 1UI.

Referring again to FIG. 4, the symbol transition timing indicating signal $u_1$ output from the first sub-phase detector 310 is supplied to a first input terminal of the selector 340. A symbol transition timing indicating signal $u_2$ output from the second sub-phase detector 320 is passed through the adder 330 and then supplied to a second input terminal of the selector 340. The adder 330 adds a binary value "100" to the symbol transition timing indicating signal $u_2$. As a result of this addition, the symbol transition timing indicating signal $u_2$ passed through the adder 330 is transformed into a symbol transition timing indicating signal $u_{20}$. The symbol transition timing indicating signal $u_{20}$ takes different values in individual cases as mentioned under (6) to (9) below and, thus, can be distinguished from the symbol transition timing indicating signal $u_1$ output from the first sub-phase detector 310.

(6) $u_{20}$=100 if the symbol value changes from 1 to 0 or from 0 to 1 during a period from $t_i$ to $t_i$+(⅛)UI.

(7) $u_{20}$=101 if the symbol value changes from 1 to 0 or from 0 to 1 during a period from $t_i$+(⅛)UI to $t_i$+(¼)UI.

(8) $u_{20}$=110 if the symbol value changes from 1 to 0 or from 0 to 1 during a period from $t_i$+(¼)UI to $t_i$+(⅜)UI.

(9) $u_{20}$=111 if the symbol value changes from 1 to 0 or from 0 to 1 during a period from $t_i$+(⅜)UI to $t_i$+(½)UI (=$t_{i+1}$).

Symbol transition presence/absence indicating signals tran$_1$ and tran$_2$ output from the first sub-phase detector 310 and the second sub-phase detector 320, respectively, are supplied to control terminals of the selector 340. In a case where tran$_1$ is equal to 1, the selector 340 selects and outputs the symbol transition timing indicating signal $u_1$ fed from the first sub-phase detector 310. In a case where tran$_2$ is equal to 1, on the other hand, the selector 340 selects and outputs the symbol transition timing indicating signal $u_{20}$ fed from the second sub-phase detector 320 through the adder 330.

A technique for detecting a transition of the symbol value, or a pulse edge, depending on whether data passes through a zero-crossing point is known as a zero-crossing method. In the zero-crossing method, a duration from a starting point of the period 1UI to a zero-crossing point is referred to as an "instantaneous phase" or an "instantaneous value".

Figure 7:
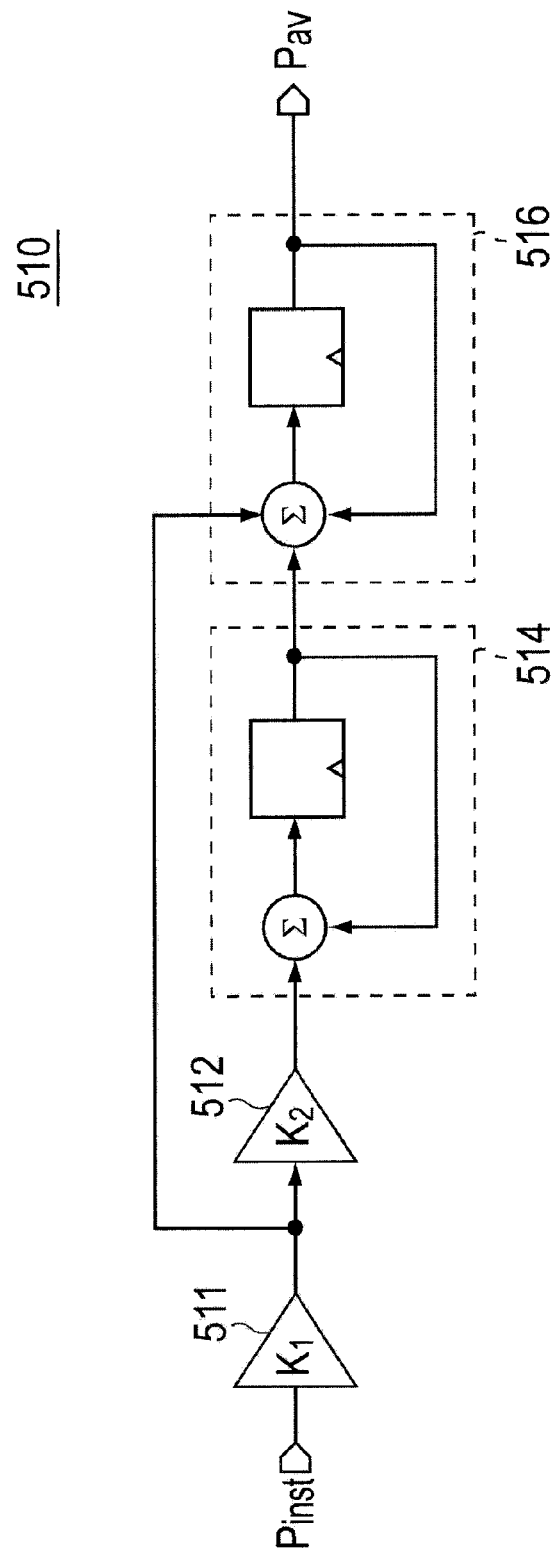
FIG. 7 is a schematic diagram illustrating the configuration of a phase filter of a judgment timing generator used in the data judgment circuit of the embodiment.

FIG. 7 illustrates the phase filter 510 of the judgment timing generator 50 used in the data judgment circuit 10 of FIG. 1. The phase filter 510 calculates the average of the timings at which the symbol value changes. The phase filter 510 includes first and second amplifiers 511, 512 and first and second integrators 514, 516. The symbol transition timing indicating signal P$_{inst}$ input into the phase filter 510 is amplified by the first amplifier 511 by a gain K1. An output of the first amplifier 511 is fed into the second amplifier 512 and further amplified thereby by a gain K2. The output of the first amplifier 511 is also fed into the second integrator 516. An output of the second amplifier 512 is fed into the first integrator 514 and an output of the first integrator 514 is fed into the second integrator 516. An output of the second integrator 516 is then supplied to the adder 520 as the aforementioned average signal P$_{av}$. The phase filter 510 may be a second-order filter using a pair of integrators as mentioned above.

Figure 8:
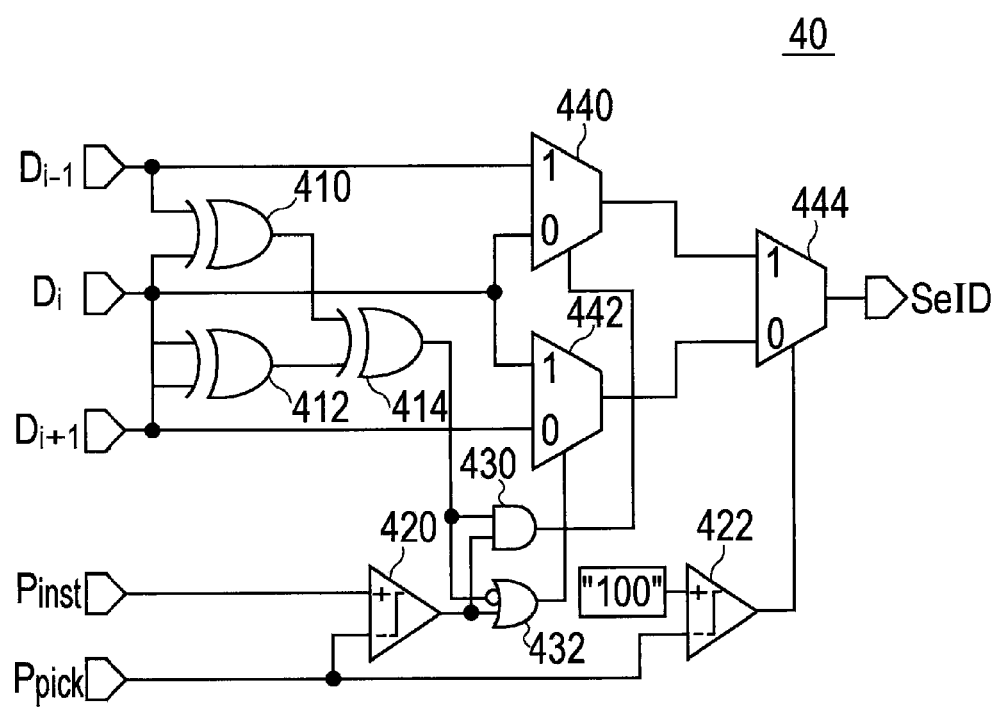
FIG. 8 is a schematic diagram illustrating the configuration of a symbol value converter used in the data judgment circuit of the embodiment.

FIG. 8 illustrates the symbol value converter 40 used in the data judgment circuit 10 of FIG. 1. The symbol value converter 40 receives the aforementioned parallel binary data D$_n$ (n=... −2, −1, 0, 1, 2, ...). The data D$_n$ is a sequence of values obtained by converting the digital values $d_n$ into binary values using the specific threshold value as discussed earlier. Also, as discussed earlier, it is assumed that the binary data input into the symbol value converter 40 at the points in time $t_{i-1}$, $t_i$ (=$t_{i-1}$+0.5UI) and $t_{i+1}$ (=$t_{i-1}$+1UI) (where i in an integer) are denoted by the reference symbols D$_{i-1}$, D$_i$ and D$_{i+1}$.

Referring to FIG. 8, the symbol value converter 40 includes first to third XOR circuits 410, 412, 414, first and second comparators 420, 422, an AND circuit 430, an OR circuit 432 and first to third selectors 440, 442, 444.

The first XOR circuit 410 receives the data D$_{i-1}$ and D$_i$ and outputs 1 if one of the data D$_{i-1}$ and D$_i$ is 1 and the other is 0. The second XOR circuit 412 receives the data D$_i$ and D$_{i+1}$ and outputs 1 if one of the data D$_i$ and D$_{i+1}$ is 1 and the other is 0. The third XOR circuit 414 receives outputs of the first XOR circuit 410 and the second XOR circuit 412 and outputs 1 if one of these outputs is 1 and the other is 0.

The first comparator 420 receives the signal P$_{inst}$ output from the phase detector 30 and the signal P$_{pick}$ output from the judgment timing generator 50. The first comparator 420 outputs 1 if P$_{inst}$>P$_{pick}$. A situation where P$_{inst}$>P$_{pick}$ is satisfied indicates, in principle, that a timing at which the symbol value changes during the specific period 1UI occurs later than a timing at which a data judgment should be made.

The second comparator 422 receives a specific binary value (="100") and the signal P$_{pick}$ output from the judgment timing generator 50 and outputs 1 if P$_{pick}$<"100". The binary value "100" corresponds to a point in time of 0.5UI within the period 1UI. The second comparator 422 determines whether the data judgment timing occurs during a first half part 0.5UI ($t_{i-1}$ to $t_i$) or a second half part 0.5UI ($t_i$ to $t_{i+1}$) of the specific period 1UI ($t_{i-1}$ to $t_{i+1}$).

The AND circuit 430 receives outputs of the third XOR circuit 414 and the first comparator 420 and outputs 1 if both of these outputs are 1.

The OR circuit 432 also receives the outputs of the third XOR circuit 414 and the first comparator 420. It is to be noted, however, that the output of the third XOR circuit 414 input into the OR circuit 432 is inverted. Therefore, the OR circuit 432 outputs 1 except when the output of the third XOR circuit 414 is 1 and the output of the first comparator 420 is 0.

The first selector 440 selectively outputs the data D$_{i-1}$ or D$_i$ in response to an output of the AND circuit 430. The second selector 442 selectively outputs the data D$_i$ or D$_{i+1}$ in response to an output of the OR circuit 432. The third selector 444 selectively outputs one of outputs of the first selector 440 and the second selector 442 in response to an output of the second comparator 422.

If {D$_{i-1}$; D$_i$; D$_{i+1}$}={1; 0; 0}, for example, the first XOR circuit 410 outputs 1 and the second XOR circuit 412 outputs 0 and, thus, the third XOR circuit 414 outputs 1. Here, a situation where {D$_{i-1}$; D$_i$, D$_{i+1}$}={1; 0; 0} is satisfied indicates that a timing at which the symbol value changes occurs during the first half part 0.5UI of the specific period 1UI. In this case, the phase detector 30 outputs P$_{inst}$=00, 01, 10 or 11 as discussed earlier with reference to FIGS. 4 to 6. On the other hand, the judgment timing generator 50 outputs the signal P$_{pick}$ (>P$_{av}$≈P$_{inst}$) indicating the timing of data judgment as discussed earlier with reference to FIG. 1. Accordingly, the first comparator 420 outputs 0 and, thus, the AND circuit 430 outputs 0 and the OR circuit 432 outputs 0. The first selector 440 selects the data $D_i$ when the output of the AND circuit 430 is 0. The second selector 442 selects the data $D_{i+1}$ when the output of the OR circuit 432 is 0. Also, the second comparator 422 outputs 0 in this case. When the output of the second comparator 422 is 0, the third selector 444 selects the output of the second selector 442, that is, the data $D_{i+1}$ in this case.

Also, if $\{D_{i-1}; D_i; D_{i+1}\}=\{0; 0; 1\}$, for example, the first XOR circuit 410 outputs 0 and the second XOR circuit 412 outputs 1 and, thus, the third XOR circuit 414 outputs 1. Here, a situation where $\{D_{i-1}; D_i; D_{i+1}\}=\{0; 0; 1\}$ is satisfied indicates that a timing at which the symbol value changes occurs during the second half part 0.5UI of the specific period 1UI. In this case, the phase detector 30 outputs $P_{inst}$=100, 101, 110 or 111 as discussed earlier with reference to FIGS. 4 to 6. On the other hand, the judgment timing generator 50 outputs the signal $P_{pick}$ ($<P_{av}\approx P_{inst}$) indicating the timing of data judgment as discussed earlier with reference to FIG. 1. Accordingly, the first comparator 420 outputs 1 and, thus, the AND circuit 430 outputs 1 and the OR circuit 432 outputs 1. The first selector 440 selects the data $D_{i-1}$ when the output of the AND circuit 430 is 1. The second selector 442 selects the data $D_i$ when the output of the OR circuit 432 is 1. Also, the second comparator 422 outputs 1 in this case. When the output of the second comparator 422 is 1, the third selector 444 selects the output of the second selector 442, that is, the data $D_{i-1}$ in this case.

Also, if $\{D_{i-1}; D_i; D_{i+1}\}=\{1; 1; 1\}$, for example, the first XOR circuit 410 outputs 0 and the second XOR circuit 412 outputs 0 and, thus, the third XOR circuit 414 outputs 0. Here, a situation where $\{D_{i-1}; D_i; D_{i+1}\}=\{1; 1; 1\}$ is satisfied indicates that a timing at which the symbol value changes does not occur during the specific period 1UI. In this case, the AND circuit 430 outputs 0 and the OR circuit 432 outputs 1 regardless of the output of the first comparator 420. Accordingly, the first selector 440 and the second selector 442 both select the data $D_i$, so that the third selector 444 outputs the data $D_i$ regardless of the output of the second comparator 422.

Also, if $\{D_{i-1}; D_i; D_{i+1}\}=\{0; 1; 0\}$, for example, the first XOR circuit 410 outputs 1 and the second XOR circuit 412 outputs 1 and, thus, the third XOR circuit 414 outputs 0. Here, a situation where $\{D_{i-1}; D_i; D_{i+1}\}=\{0; 1; 0\}$ is satisfied indicates that a timing at which the symbol value changes occurs during each of the first half part 0.5UI and the second half part 0.5UI of the specific period 1UI. In this case, the AND circuit 430 outputs 0 and the OR circuit 432 outputs 1 regardless of the output of the first comparator 420. Accordingly, the first selector 440 and the second selector 442 both select the data $D_i$, so that the third selector 444 outputs the data $D_i$ regardless of the output of the second comparator 422.

The symbol value converter 40 configured as described above can read the value of each successive symbol contained in a symbol train at a midpoint of a pulse corresponding to every symbol. The symbol value converter 40 outputs a signal SelD indicating symbol values thus read.

Figure 9:
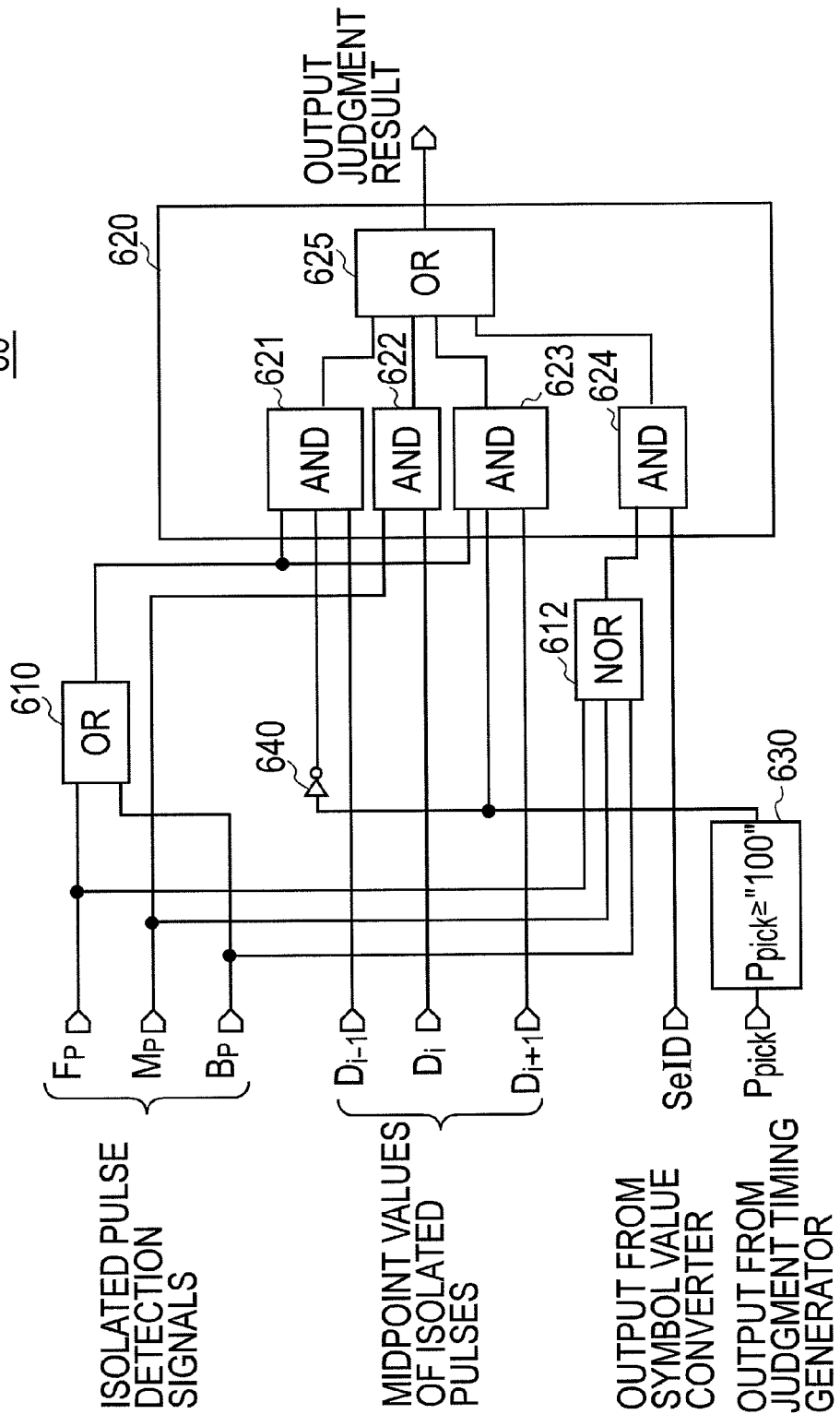
FIG. 9 is a schematic diagram illustrating the configuration of a data selector used in the data judgment circuit of the embodiment.

FIG. 9 illustrates the data selector 60 used in the data judgment circuit 10 of FIG. 1. The data selector 60 selects a logical value of the isolated pulse in accordance with the midpoint logical value and the timing information of the isolated pulse. The data selector 60 includes a first OR circuit 610, a NOR circuit 612, a selector 620, a comparator 630 and a NOT circuit 640. The selector 620 selects a binary value output from one of the isolated pulse detector 20 and the symbol value converter 40. To make this possible, the selector 620 includes first to fourth AND circuits 621, 622, 623, 624 and a second OR circuit 625.

The first OR circuit 610 receives the signals $F_p$ and $B_p$ output respectively from the first and third special pulse train detectors $210_1$, $210_3$ used in the isolated pulse detector 20 of FIG. 2, respectively. The first OR circuit 610 outputs 1 except when both of the signals $F_p$ and $B_p$ are 0.

The NOR circuit 612 receives the signals $F_p$, $M_p$ and $B_p$ output from the first, second and third special pulse train detectors $210_1$, $210_2$, $210_3$ used in the isolated pulse detector 20 of FIG. 2, respectively. The NOR circuit 612 outputs 1 only when all of the signals $F_p$, $M_p$ and $B_p$ are 0.

The comparator 630 determines whether the timing signal $P_{pick}$ output from the judgment timing generator 50 has a value equal to or larger than the aforementioned specific binary value (="100") and then outputs 1 if $P_{pick} \geqq$ "100". As previously mentioned, the signal $P_{pick}$ indicates the timing at which a data judgment is made for each successive symbol. In other words, the signal $P_{pick}$ indicates the phase of a midpoint of each symbol. The binary value "100" corresponds to a point in time of 0.5UI within the period 1UI. Therefore, the second comparator 422 is caused to determine whether the data judgment can be made in the first half part 0.5UI ($t_{i-1}$ to $t_i$) or the second half part 0.5UI ($t_i$ to $t_{i+1}$) of the specific period 1UI ($t_{i-1}$ to $t_{i+1}$).

The first AND circuit 621 receives an output of the first OR circuit 610, an output of the comparator 630 inverted by the NOT circuit 640 and a midpoint value of a pulse output from the isolated pulse detector 20, or the data $D_{i-1}$. The first AND circuit 621 outputs 1 only when all of these input signals are 1.

The second AND circuit 622 receives the signal $M_p$ output from the second special pulse train detector $210_2$ used in the isolated pulse detector 20 of FIG. 2 and a midpoint value of a pulse output from the isolated pulse detector 20, or the data $D_i$. The second AND circuit 622 outputs 1 only when all of these input signals are 1.

The third AND circuit 623 receives the output of the first OR circuit 610, the output of the comparator 630 and a midpoint value of a pulse output from the isolated pulse detector 20, or the data $D_{i+1}$. The third AND circuit 623 outputs 1 only when all of these input signals are 1.

The fourth AND circuit 624 receives an output of the NOR circuit 612 and the signal SelD output from the symbol value converter 40 of FIG. 8. The fourth AND circuit 624 outputs 1 only when all of these input signals are 1.

The second OR circuit 625 receives outputs of the first to fourth AND circuits 621, 622, 623, 624. The second OR circuit 625 outputs 1 except when all of the first to fourth AND circuits 621, 622, 623, 624 are 0.

It is assumed, for example, that the isolated pulse detector 20 has not detected an isolated pulse. In this case, all of the signals $F_p$, $M_p$ and $B_p$ output respectively from the first, second and third special pulse train detectors $210_1$, $210_2$, $210_3$ are 0. Accordingly, the first OR circuit 610 outputs 0 so that both the first AND circuit 621 and the third AND circuit 623 output 0. The second AND circuit 622 also outputs 0. Since the NOR circuit 612 outputs 1 in this case, the output of the fourth AND circuit 624 and, thus, an output of the second OR circuit 625 are determined by the signal SelD output from the symbol value converter 40. Specifically, the second OR circuit 625 outputs 1 when the value of the signal SelD is 1, and outputs 0 when the value of the signal SelD is 0. It is understood from the above that the selector 620 operates so as to select the value of the signal SelD obtained by a data judgment made for each successive symbol by the symbol value converter 40.

It is now assumed, for example, that binary data expressed by a pulse train "00100" is input into the data judgment circuit 10. In this case, the isolated pulse detector 20 outputs $M_p=1$ from the second special pulse train detector $210_2$ to notify the data selector 60 that an isolated pulse is contained in 3 bits in a middle part of the 5-bit data pulse train. Data output from the isolated pulse detector 20 in this case is $\{D_{i-1}; D_i; D_{i+1}\}=\{0; 1; 0\}$ so that the second AND circuit 622 outputs 1. On the other hand, the values of the signals $F_p$ and $B_p$ output respectively from the first and third special pulse train detectors $210_1$, $210_3$ are both 0. Accordingly, the first OR circuit 610 outputs 0 so that both the first AND circuit 621 and the third AND circuit 623 output 0. The NOR circuit 612 also outputs 0 in this case so that the fourth AND circuit 624 outputs 0 regardless of the value of the signal SelD input from the symbol value converter 40. Consequently, the second OR circuit 625 outputs 1. It is understood from the above that the selector 620 operates so as to select the value $D_i$ of the symbol corresponding to the isolated pulse detected by the isolated pulse detector 20.

Next, it is assumed, for example, that binary data expressed by a pulse train "01000" is input into the data judgment circuit 10. In this case, the isolated pulse detector 20 outputs $F_p=1$ from the first special pulse train detector $210_1$ to notify the data selector 60 that an isolated pulse is contained in 3 bits in a leading part of the 5-bit data pulse train. Accordingly, the first OR circuit 610 outputs 1. Data output from the isolated pulse detector 20 in this case is $\{D_{i-1}; D_i, D_{i+1}\}=\{1; 0; 0\}$ so that the first AND circuit 621 outputs 1 if the output of the comparator 630 is 0. A situation where the output of the comparator 630 is 0 indicates that the data judgment timing occurs during the first half part 0.5UI ($t_{i-1}$ to $t_i$) of the specific period 1UI ($t_{i-1}$ to $t_{i+1}$). The second AND circuit 622 outputs 0 in this case because the value of the signal $M_p$ output from the second special pulse train detector $210_2$ is 0 and the value of the data $D_i$ input into the data judgment circuit 10 at time $t_i$ is 0. Also, the third AND circuit 623 outputs 0 because the value of the data $D_{i+1}$ input into the data judgment circuit 10 at time $t_{i+1}$ is 0. Additionally, the NOR circuit 612 outputs 0 in this case so that the fourth AND circuit 624 outputs 0 regardless of the value of the signal SelD input from the symbol value converter 40. Consequently, the second OR circuit 625 outputs 1. It is understood from the above that the selector 620 operates so as to select the value $D_{i-1}$ of the symbol corresponding to the isolated pulse detected by the isolated pulse detector 20.

Further, it is assumed, for example, that binary data expressed by a pulse train "00010" is input into the data judgment circuit 10. In this case, the isolated pulse detector 20 outputs $B_p=1$ from the third special pulse train detector $210_3$ to notify the data selector 60 that an isolated pulse is contained in 3 bits in a trailing part of the 5-bit data pulse train. Accordingly, the first OR circuit 610 outputs 1. Data output from the isolated pulse detector 20 in this case is $\{D_{i-1}; D_i; D_{i+1}\}=\{0; 0; 1\}$ so that the third AND circuit 623 outputs 1 if the output of the comparator 630 is 1. A situation where the output of the comparator 630 is 1 indicates that the data judgment timing occurs during the second half part 0.5UI ($t_i$ to $t_{i+1}$) of the specific period 1UI ($t_{i-1}$ to $t_{i+1}$). The first AND circuit 621 outputs 0 in this case because the value of the data $D_{i-1}$ input into the data judgment circuit 10 at time $t_{i-1}$ is 0. Also, the second AND circuit 622 outputs 0 because the value of the signal $M_p$ output from the second special pulse train detector $210_2$ is 0 and the value of the data $D_i$ input into the data judgment circuit 10 at time $t_i$ is 0. Additionally, the NOR circuit 612 outputs 0 in this case so that the fourth AND circuit 624 outputs 0 regardless of the value of the signal SelD input from the symbol value converter 40. Consequently, the second OR circuit 625 outputs 1. It is understood from the above that the selector 620 operates so as to select the value $D_{i+1}$ of the symbol corresponding to the isolated pulse detected by the isolated pulse detector 20.

The data selector 60 configured as described above can select a value output from one of the isolated pulse detector 20 and the symbol value converter 40 according to the result of detection by the isolated pulse detector 20. Specifically, if the isolated pulse detector 20 detects that an isolated pulse is contained in a symbol train, the data judgment circuit 10 outputs as a detected symbol value one of the values $D_{i-1}$, $D_i$, $D_{i+1}$ obtained by the data judgment operation performed by the isolated pulse detector 20 on the symbol train having a specific length. On the other hand, if no isolated pulse is contained in the symbol train, the data judgment circuit 10 outputs as the detected symbol value the value SelD obtained by the data judgment operation performed by the symbol value converter 40 on each successive symbol.

Now, the working of the data judgment circuit 10 of the foregoing embodiment is described in greater detail with reference to FIGS. 10-1A to 10-1D and 10-2A to 10-2C.

Figures 1A, 10:
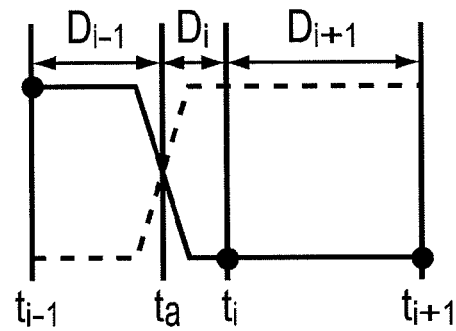
Figures 1B, 10:
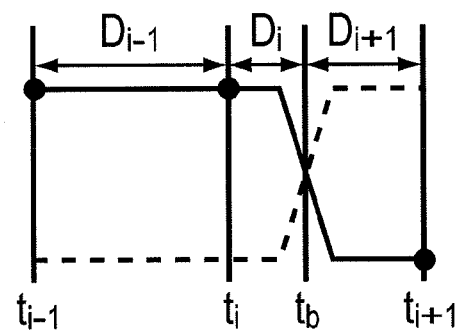
Figures 1C, 10:
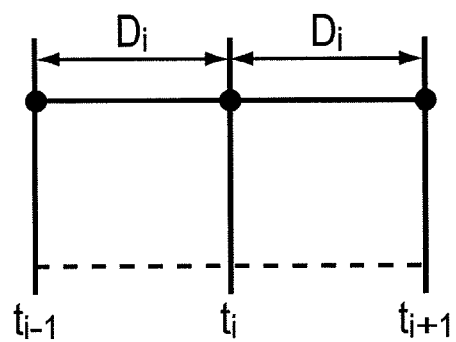
Figures 1D, 10:
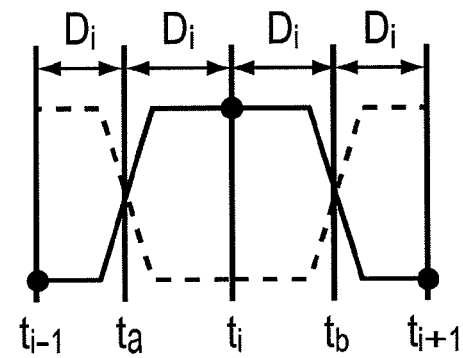

FIG. 10-1A to 10-1D illustrate the data judgment operation performed when no isolated pulse is contained in a symbol train. First discussed here referring to FIG. 10-1A is a case in which a symbol transition timing occurs during the first half part 0.5UI ($t_i$ to $t_{i+1}$) of the specific period 1UI ($t_{i-1}$ to $t_{i+1}$). Here, it is assumed that a transition of the symbol value occurs at time $t_a$. If a data judgment timing $t_{pick}$ occurs during a period from $t_{i-1}$ to $t_a$ ($t_{i-1}<t_{pick}<t_a$) in this case, the data judgment circuit 10 outputs the value $D_{i-1}$ obtained at time $t_{i-1}$. If $t_a<t_{pick}<t_i$, the data judgment circuit 10 outputs the value $D_i$ obtained at time $t_i$. Also, if $t_i<t_{pick}<t_{i+1}$, the data judgment circuit 10 outputs the value $D_{i+1}$ obtained at time $t_{i+1}$.

Discussed next referring to FIG. 10-1B is a case in which a symbol transition timing occurs during the second half part 0.5UI ($t_i$ to $t_{i+1}$) of the specific period 1UI ($t_{i-1}$ to $t_{i+1}$). Here, it is assumed that a transition of the symbol value occurs at time $t_b$. If $t_{i-1}<t_{pick}<t_i$ in this case, the data judgment circuit 10 outputs the value $D_{i-1}$ obtained at time $t_{i-1}$. If $t_i<t_{pick}<t_b$, the data judgment circuit 10 outputs the value $D_i$ obtained at time $t_i$. Also, if $t_b<t_{pick}<t_{i+1}$, the data judgment circuit 10 outputs the value $D_{i+1}$ obtained at time $t_{i+1}$.

In a case where no transition of the symbol value occurs during the specific period 1UI ($t_{i-1}$ to $t_{i+1}$) as illustrated in FIG. 10-1C, the data judgment circuit 10 outputs the value $D_i$ obtained at time $t_i$.

Furthermore, in a case where a transition of the symbol value occurs during the first half part 0.5UI ($t_{i-1}$ to $t_i$) of the specific period 1UI ($t_{i-1}$ to $t_{i+1}$) and in the second half part 0.5UI ($t_i$ to $t_{i+1}$) thereof as illustrated in FIG. 10-1D, the data judgment circuit 10 outputs the value $D_i$ obtained at time $t_i$.

FIGS. 10-2A to 10-2C illustrate the data judgment operation performed when an isolated pulse is contained in a symbol train. In a case where the isolated pulse detector 20 detects that an isolated pulse is contained in 3 bits in a middle part of a 5-bit data pulse train as illustrated in FIG. 10-2A, the data judgment circuit 10 outputs the value of a central bit of the 3 bits in the middle part of the pulse train, or the value $D_i$ obtained at time $t_i$.

Discussed next referring to FIGS. 10-2B and 10-2C are cases in which an isolated pulse is contained in 3 bits in a leading part or a trailing part of a 5-bit data pulse train. If $t_{i-1} \leq t_{pick}<t_i$ in these cases, the data judgment circuit 10 outputs the value of a central bit of the 3 bits in the leading part of the pulse train, or the value $D_{i-1}$ obtained at time $t_{i-1}$. If $t_i \leq t_{pick} < t_{i+1}$, the data judgment circuit 10 outputs the value of a central bit of the 3 bits in the trailing part of the pulse train, or the value $D_{i+1}$ obtained at time $t_{i+1}$.

Figure 11:
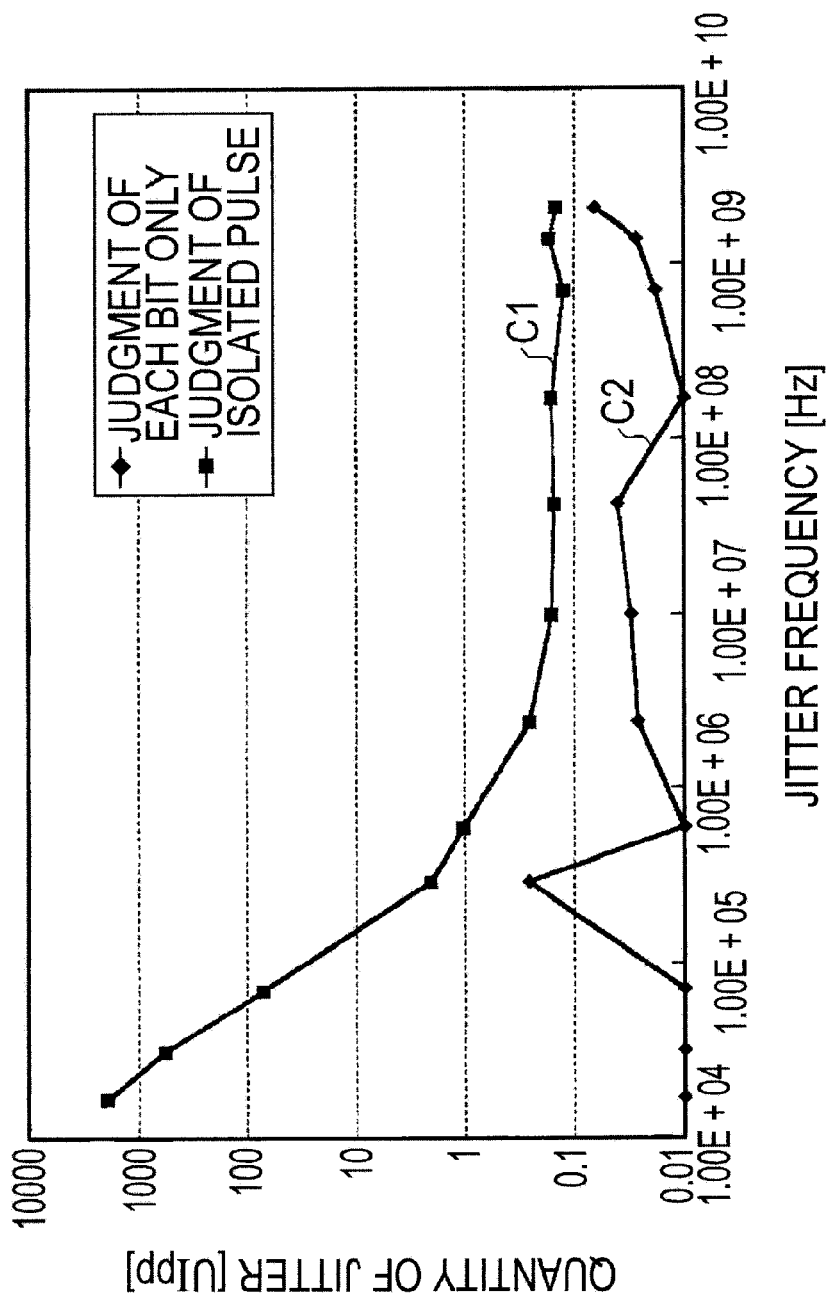
FIG. 11 is a graph illustrating jitter tolerance of the data judgment circuit of the embodiment.

FIG. 11 is a graph illustrating how much the data judgment accuracy is improved by making a data judgment for the entire symbol train in addition to a data judgment for each successive symbol, wherein the horizontal axis represents jitter frequency (Hz) and the vertical axis represents the quantity of jitter (UIpp).

In FIG. 11, a curve C1 illustrates a relationship between the jitter frequency and the quantity of jitter obtained when the data judgment circuit 10 of the present embodiment makes a data judgment for the entire symbol train in addition to a data judgment for each successive symbol, or when the isolated pulse detector 20 is used. On the other hand, a curve C2 in FIG. 11 illustrates a relationship between the jitter frequency and the quantity of jitter obtained when the data judgment circuit 10 makes only the data judgment for each successive symbol, or when the isolated pulse detector 20 is not used. It is apparent from FIG. 11 that jitter tolerance is improved when the data judgment circuit 10 makes the data judgment for the entire symbol train in addition to the data judgment for each successive symbol as illustrated by the curve C1.

It is understood from the foregoing discussion that it is possible to lower the resolution of the ADC while keeping a desired level of data judgment accuracy by making the data judgment for the entire symbol train in addition to the data judgment for each successive symbol. It is known that power consumption and a mounting area of the ADC decrease exponentially when the number of bits required decreases. Therefore, by lowering the resolution of the ADC, it is possible to prevent an increase in circuit complexity and power consumption of the entire receiver caused by the use of the ADC.

Specific examples of receivers incorporating various types of data judgment circuits according to the aforementioned embodiment of the invention are now described.

Example 1

Figure 12:
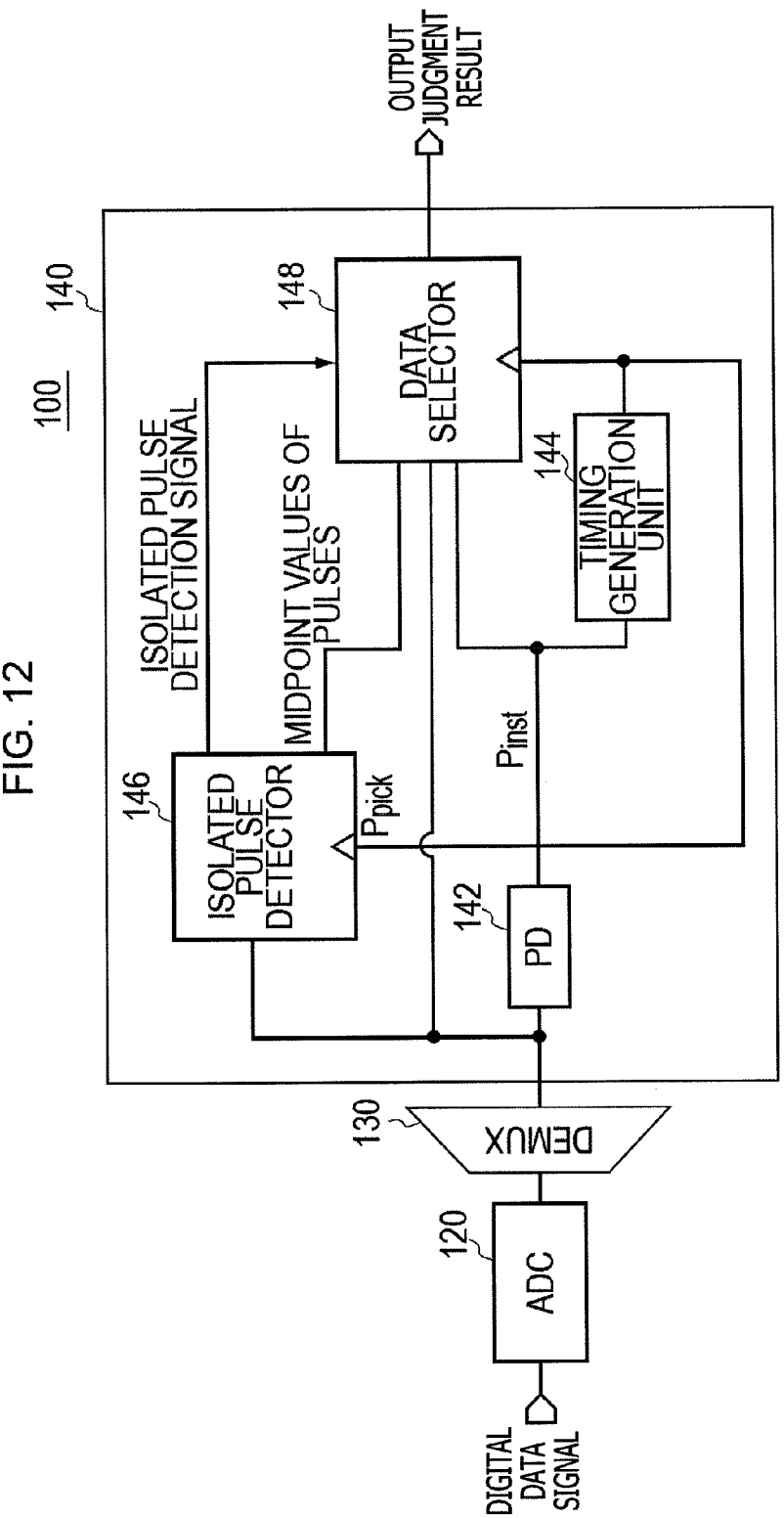
FIG. 12 is a block diagram illustrating the configuration of a receiver according to Example 1.

FIG. 12 illustrates a receiver 100 according to Example 1. The receiver 100 includes an ADC 120, a demultiplexer 130 and a data judgment circuit 140.

The receiver 100 receives a digital data signal containing a symbol train which is a sequence of a plurality of symbols. The digital data signal may be, for example, an NRZ binary signal transmitted at a transmission rate of 5 Gb/s. The ADC 120 receives the signal and converts into a plurality of symbols in accordance with a sampling period. The ADC 120 is a 4-bit analog-to-digital converter which converts the received digital data signal amplitude into digital values at the sampling rate of 10 Gsamples/s, for example. The demultiplexer 130 converts the digital values output from the ADC 120 into parallel binary data having a 16-bit length by dividing the digital values into 16 segments using a clock frequency of 625 MHz, for example. The parallel binary data are input into the data judgment circuit 140. The data judgment circuit 140 of Example 1 includes a phase detector 142, a judgment timing generator 144, an isolated pulse detector 146 and a data selector 148.

The phase detector 142 detects a zero-crossing point in accordance with the sampling period. The phase detector 142 may have substantially the same configuration as the phase detector 30 described earlier with reference to FIGS. 4 to 6. Based on input digital data, the phase detector 142 detects a timing at which the value of each successive symbol in a symbol train changes from 1 to 0 or from 0 to 1 by the zero-crossing method and outputs a signal $P_{inst}$ indicating the timing at which the symbol value changes.

The judgment timing generator 144 may have substantially the same configuration as the judgment timing generator 50 described earlier with reference to FIG. 7. The judgment timing generator 144 smoothes out the signal $P_{inst}$ output from the phase detector 142 and obtains a timing of data judgment. The judgment timing generator 144 generates a signal $P_{av}$ indicating an average of timings at which the symbol value changes by smoothing out the signal $P_{inst}$ output from the phase detector 142. The judgment timing generator 144 further generates a signal $P_{pick}$ indicating the timing of data judgment by shifting the phase of the average signal $P_{av}$ by 0.5UI.

The isolated pulse detector 146 determines whether a symbol train having a specific bit length is a special symbol train containing an isolated pulse. For example, the isolated pulse detector 146 determines whether a 4-bit symbol train constructed by adding two preceding symbols and one following symbol to a symbol subjected to data judgment has a symbol pattern "0010" or "1101".

To be more specific, the isolated pulse detector 146 selects an even or odd data train from the parallel binary data input from the ADC 120 through the demultiplexer 130 according to the judgment timing represented by the signal $P_{pick}$ output from the judgment timing generator 144. Here, the "even or odd data train" refers to a sequence of data sets chosen from the parallel binary data, each data set containing three consecutive data in which even-numbered or odd-numbered data is located at a midpoint. The digital data signal being transmitted is sampled at the sampling rate twice as high as the transmission rate as previously mentioned. Therefore, in the parallel binary data, a data set containing three consecutive data in which even-numbered or odd-numbered data is located at a midpoint covers a range of phase equal to 1UI which corresponds to the bit length of the unit symbol. The isolated pulse detector 146 selects a data train (even or odd data train) located closer to the judgment timing specified by the signal $P_{pick}$. The isolated pulse detector 146 judges whether each data set contained in the selected data train has a specific pulse pattern. To enable the isolated pulse detector 146 to make such a judgment, the isolated pulse detector 146 may be configured to include combinations of logic circuits each including AND and OR circuits like the special pulse train detectors $210_m$ described earlier with reference to FIGS. 2 and 3. The isolated pulse detector 146 thus configured can determine whether a symbol train has the symbol pattern "0010" or "1101".

If the symbol train has the symbol pattern "0010" or "1101", the isolated pulse detector 146 judges that the symbol train is a special symbol train and notifies the data selector 148 of the relevant judgment result. Further, the isolated pulse detector 146 outputs the value of a symbol subjected to data judgment, that is, the logical value of the symbol corresponding to the third bit of the symbol pattern in above-described example.

In principle, the symbol value converter 148 has the same configuration as the symbol value converter 40 described earlier with reference to FIG. 8. The symbol value converter 148 however differs from the symbol value converter 40 of FIG. 8 in that the symbol value converter 148 outputs the value of the symbol output from the isolated pulse detector 146 in accordance with the judgment result obtained thereby instead of the value obtained by a data judgment made for each successive symbol. For this reason, the symbol value converter 148 may include the same data selector 60 as described earlier with reference to FIG. 9. Alternatively, the symbol value converter 148 may simply overwrite the value obtained by the data judgment made for each successive symbol with the value of the symbol output from the isolated pulse detector 146.

The data judgment circuit 140 may be configured to directly detect symbol values corresponding to the special symbol train and the isolated pulse.

Example 2

Figure 13:
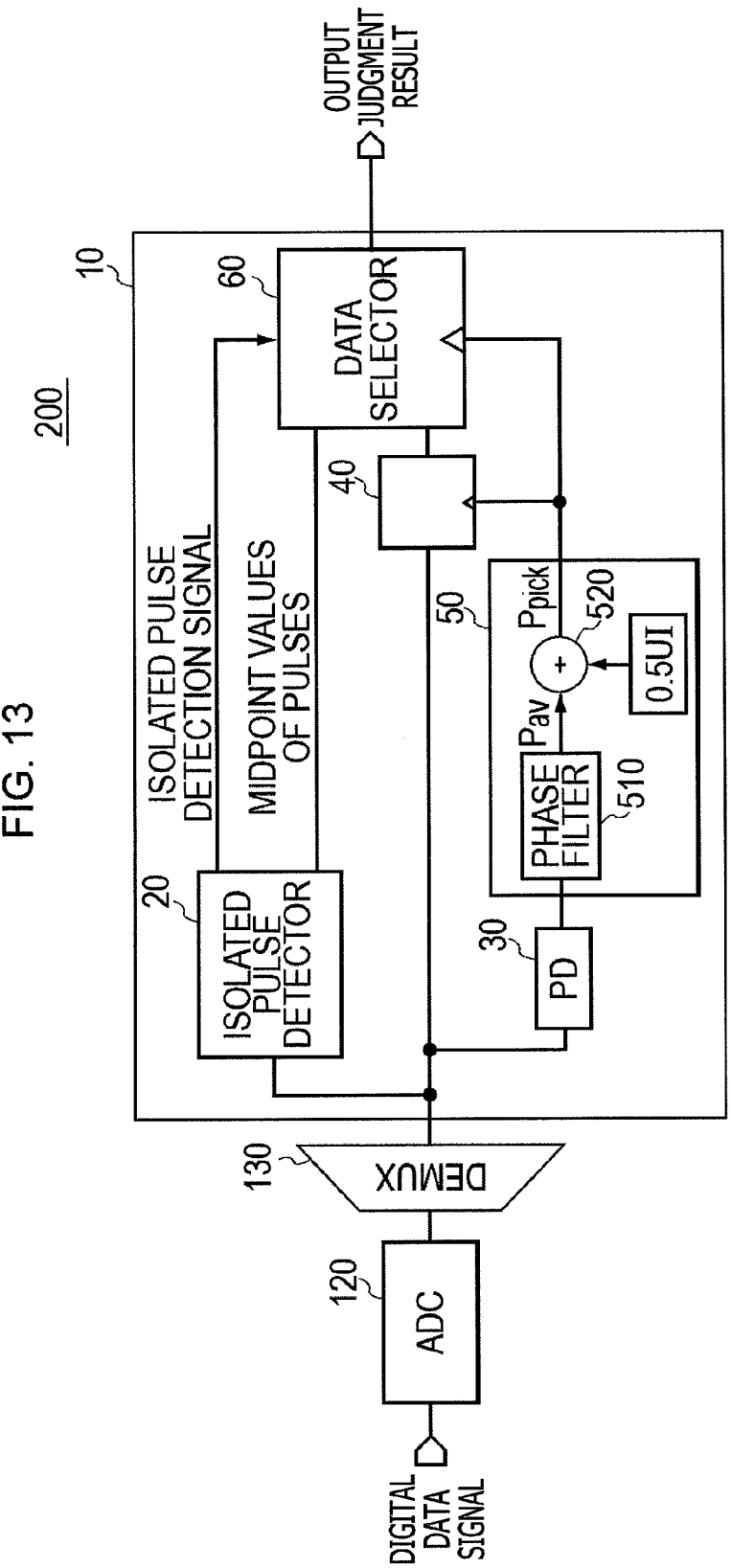
FIG. 13 is a block diagram illustrating the configuration of a receiver according to Example 2.

FIG. 13 is a block diagram illustrating a receiver 200 according to Example 2. The receiver 200 differs from the receiver 100 of Example 1 illustrated in FIG. 12 in that the receiver 200 includes the same data judgment circuit 10 as previously described with reference to FIGS. 1 to 9.

The data judgment circuit 10 judges whether the parallel binary data input from the ADC 120 through the demultiplexer 130 contains a pulse train "010" or "101" by using the isolated pulse detector 20 which is configured as illustrated in FIG. 2. The isolated pulse detector 20 judges whether each data set containing three consecutive data, among data sets whose phases are successively offset by 0.5UI, is the pulse train "010" or "101". A range of phase covered by 3-bit consecutive binary data corresponds to a phase range covered by one symbol. Therefore, the isolated pulse detector 20 can detect a 1-bit long isolated pulse by detecting that 3-bit consecutive binary data constitutes the pulse train "010" or "101". The isolated pulse detector 20 of Example 2 differs from the isolated pulse detector 146 used in the data judgment circuit 140 of Example 1 as described above, so that the isolated pulse detector 20 does not require the judgment timing signal indicating $P_{pick}$ generated by the judgment timing generator 50.

Unlike the data judgment circuit 140 of Example 1, the data judgment circuit 10 further includes the data selector 60 in a succeeding stage of the symbol value converter 40. When an isolated pulse has been detected by the isolated pulse detector 20, the data selector 60 selects and outputs a midpoint value of the detected isolated pulse as previously discussed with reference to FIG. 9. When an isolated pulse has not been detected, on the other hand, the data selector 60 selects and outputs a value obtained by a data judgment made for each successive symbol by the symbol value converter 40.

Compared to the data judgment circuit 140 of Example 1, the data judgment circuit 10 does not require the judgment timing in detecting a special symbol train so that there is produced an advantage that the data judgment circuit 10 has a simple circuit configuration. Additionally, as the isolated pulse detector 20 and the symbol value converter 40 operate independently of each other and the data selector 60 of the data judgment circuit 10 just selects one of outputs of the isolated pulse detector 20 and the symbol value converter 40, there is produced another advantage that a delay in data judgment is reduced.

Example 3

Figure 14:
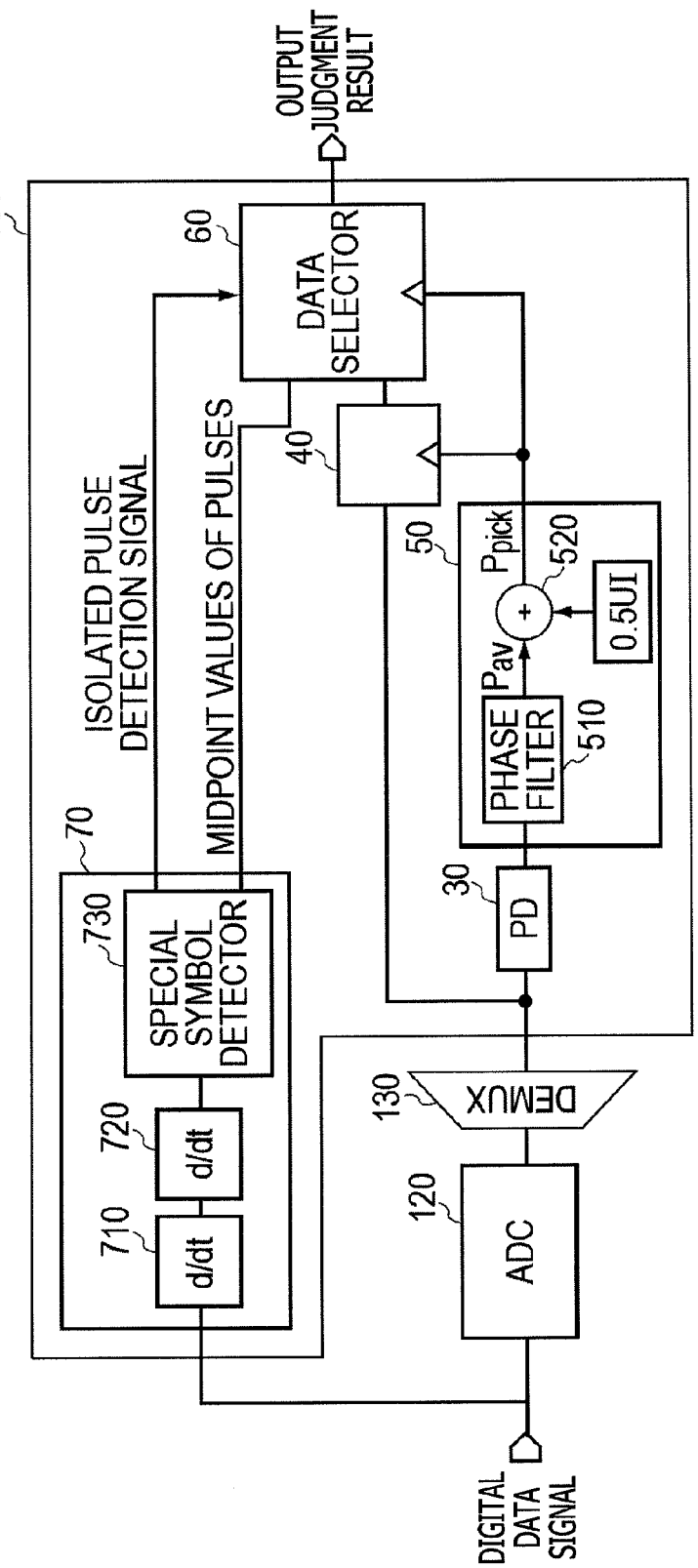
FIG. 14 is a block diagram illustrating the configuration of a receiver according to Example 3.

FIG. 14 is a block diagram illustrating a receiver 300 according to Example 3. The receiver 300 differs from the receiver 200 of Example 2 illustrated in FIG. 13 in that an isolated pulse detector 70 detects isolated pulses directly from the digital data signal receives by the receiver 300. The receiver 300 has otherwise the same configuration as the receiver 200 of Example 2 illustrated in FIG. 13 and therefore a detailed description of the configuration is not provided below.

The isolated pulse detector 70 includes differentiating circuits and a special symbol detector, the differentiating circuits outputting a pulse in accordance with the receiving symbol train, and the special symbol detector detecting the isolated pulse when the amplitude of the pulse output from differentiating circuit is more than a predetermined value.

The isolated pulse detector 70 includes two cascade-connected analog differentiating circuits 710, 720 and a special symbol detector 730 connected to an output terminal of the analog differentiating circuit 720. Each of the analog differentiating circuits 710, 720 may be a differential amplifier which produces a differential property by using capacity degeneration in a differential pair. This type of two cascade-connected analog differentiating circuits 710, 720 generates a negative pulse when a symbol train having a symbol pattern "010" is input, a positive pulse when a symbol train having a symbol pattern "101" is input. If the pulse generated by the two cascade-connected analog differentiating circuits 710, 720 exceeds a specific threshold value, the special symbol detector 730 judges that the symbol pattern "010" or "101" has been input and then notifies the data selector 60 of the relevant judgment result. The special symbol detector 730 also outputs 0 or 1 as the value of the symbol corresponding to an isolated pulse at the middle of the symbol pattern at the same time depending on whether the pulse generated by the two cascade-connected analog differentiating circuits 710, 720 is negative or positive, respectively.

The working of the above-described isolated pulse detector 70 is substantially the same as that of the isolated pulse detector 20 used in the data judgment circuit 10 of Example 2. Since the detecting performance of the isolated pulse detector 70 does not depend on the resolution of the ADC 120, however, it is possible to reduce hardware complexity by lowering the resolution of the ADC 120.

The foregoing embodiment including Examples 1 to 3 described above can be implemented in various fields of high-speed serial communications carried out at a signal rate of a few Gb/s to a few tens of Gb/s, including chip-to-chip communications, board-to-board communications conducted through connectors, cabinet-to-cabinet communications conducted over a cable and optical communications, for example. The embodiment can also be implemented in the form of IC products, such as serializer/deserializer (SerDes) chips capable of multiplexing low-speed serial signals into a high-speed parallel signal and IC chips having a communication function or a switching function of a server. Furthermore, the embodiment is applicable to a wide variety of products using such ICs.

While the invention has thus far been described through a discussion of the preferred embodiment and the specific Examples thereof, the invention is not limited thereto. It should be understood that the aforementioned embodiment and Examples are simply illustrative and may be modified in various ways without departing from the scope and spirit of the invention.

The foregoing embodiment including Examples 1 to 3 has been described, by way of example, with reference to the receiver which samples input data at the sampling rate twice as high as the data transmission rate. Practically, however, the sampling rate of the receiver may be of any value as long as the sampling rate is high enough to ensure a minimum required level of sampling performance. For example, in a receiver configured to sample input data at a sampling rate four times as high as the data transmission rate, five consecutive data are input into a data judgment circuit during the aforementioned period 1UI. In this case, the data judgment circuit illustrated in the accompanying drawings may be modified as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A receiver that receives a train of a plurality of symbols representing digital data, comprising:
    an isolated pulse detector that detects whether the digital data includes an isolated pulse in the symbol train, respectively;
    a phase detector that detects a timing at which the level of the symbols changes;
    a symbol value converter that converts the symbols into logical values on the basis of the timing detected by the phase detector; and
    a data selector that selects a logical value of the isolated pulse instead of the logical value converted by the symbol value converter when the isolated pulse detector detects the digital data including the isolated pulse.

2. The receiver of claim 1, wherein the isolated pulse detector converts the symbols of the digital data into logical values, and detects the digital data including the isolated pulse when a midpoint logical value of the symbol train is different from logical values next to the midpoint logical value.

3. The receiver of claim 2, wherein the isolated pulse detector outputs the midpoint logical value and timing information of the isolated pulse to the data selector when the midpoint logical value of the symbol train is different from logical values next to the midpoint logical value.

4. The receiver of claim 3, wherein the data selector selects a logical value of the isolated pulse in accordance with the midpoint logical value and the timing information of the isolated pulse.

5. The receiver of claim 1, wherein the isolated pulse detector includes differentiating circuits and a detector, the differentiating circuits outputting a pulse in accordance with the receiving symbol train, and the detector detecting the isolated pulse when the amplitude of the pulse output from differentiating circuit is more than a predetermined value.

6. The receiver of claim 5, wherein each of the differentiating circuits is differential amplifier which produces differential property.

7. The receiver of claim 1, further comprising an analog-to-digital converter that receives a signal and converts into a plurality of symbols in accordance with a sampling period, wherein the phase detector detects a zero-crossing point in accordance with the sampling period.

8. The receiver of claim 1, further comprising a judgment timing generator that shifts a half of a period of the symbol from an average of the timings at which the symbol value changes.

9. The receiver of claim 8, the judgment timing generator including a phase filter that calculates the average of the timings at which the symbol value changes.

* * * * *